Nov. 1, 1927.

H. D. MULLAN 1,647,651

REFLECTING LAMP MOUNTING FOR MOTOR VEHICLES

Filed May 28, 1925

INVENTOR.
Harry D. Mullan
BY
Erwin, Wheeler & Woolard
ATTORNEYS

Patented Nov. 1, 1927.

1,647,651

UNITED STATES PATENT OFFICE.

HARRY D. MULLAN, OF MILWAUKEE, WISCONSIN.

REFLECTING LAMP MOUNTING FOR MOTOR VEHICLES.

Application filed May 28, 1925. Serial No. 33,357.

This invention relates to improvements in reflecting lamp mountings for motor vehicles.

It is the primary object of the invention to provide novel and improved means for protecting motor vehicles from being struck at night by other vehicles approaching from either side.

The ordinary lights of the motor vehicle are directed either forwardly or rearwardly and when vehicles are operated in cities, and frequently when they are parked at the curb, their running lights are so dimmed as to be inconspicuous and occasionally invisible to the operator of another vehicle approaching from the side. Attempts have been made to meet this problem by placing electrically illuminated lamps on the running boards of the vehicles, but this involves expense incident to the furnishing of current for two additional incandescent bulbs, and it also involves the placing of obstructions on the running boards in such positions that the occupants of the vehicles may conceivably trip thereon. It is, therefore, greatly to be desired that some means be provided for warning the operators of vehicles approaching from the side without using additional battery current and without obstructing or impeding the running board.

It is the purpose of the present invention to provide a device incorporating the above mentioned desirable feature and furthermore one which is readily adapted for attachement to the vehicle by persons unskilled in mechanics.

This last mentioned object makes it necessary to consider a further problem relating to the disposition of a light reflecting lamp in such a position that it cannot only be attached with the greatest of ease by unskilled persons, but also that it may be attached in such a position that it will, to the above advantage, serve the purpose for which it is intended. Under the modern headlight laws, illumination from the headlight of a motor vehicle is directed horizontally or downwardly and consequently where these laws are strictly observed, the brighter rays from the automobile headlights never reach the upper portions of other vehicles. It is desirable to the successful operation of a reflecting warning lamp that this lamp shall be so constructed as to be attachable to the lower part of the motor vehicle upon which it is used.

Another important feature of the invention relates to the fact that where this invention is carried out in its preferred form the operator of another vehicle not only is made aware of the presence of the vehicle upon which the invention is mounted, but he is also apprised in a general way of the space occupied by the vehicle carrying the warning lamps.

In the drawings.

Like parts are designated by like reference characters throughout the several views.

This invention contemplates the use of a light reflecting device which in itself is well known in the art and which comprises a mirror 10 preferably faceted as shown in the accompanying drawings and provided with a silvered or otherwise light reflecting backing. This mirror will ordinarily be made of ruby colored glass and its faceted design is such as to be adapted to refract the light in a number of directions so that headlights approaching at a variety of angles to the axis of the mirror will have their rays reflected and refracted to the operator of the vehicle upon which the headlights are mounted. Such devices are now in common use as substitutes for tail lights for bicycles and the like, and I do not claim any invention with regard to the mirror 10 per se.

As will be more fully explained hereinafter, my invention consists in the application of such a mirror to the wheel hubs of motor vehicles. This is best accomplished by attaching the mirror to the hub cap. Hub caps are inexpensive articles which may be very economically made to incorporate a mirror of the sort above described, and the threaded attachment of the hub cap to the wheel of the vehicle is such that any person of however little experience in mechanics may readily remove from the vehicle the hub caps with which it is equipped and may substitute therefore the improved lamp mounting embodying this invention.

Some of the advantages in mounting a reflecting lamp of this type on vehicle hubs have already been made apparent by the foregoing disclosure. In the first place the hubs are at such a height as to receive the most brilliant light emitted from the legally restricted modern automobile headlights. This is a great advantage for the reason that if the reflecting mirror were located at too great a height on the vehicle it would catch only such stray beams of light as were emitted from the approaching headlight in violation of the law at such an angle as to be of no service upon the road, and under modern conditions only the comparatively weaker beams are emitted at this angle. Within the height which is available to receive the directed and more powerful beams of an approaching headlight, the wheel hub offers the most convenient and accessible position in which a reflecting lamp embodying this invention may be fixed by inexperienced persons.

Figure 1:
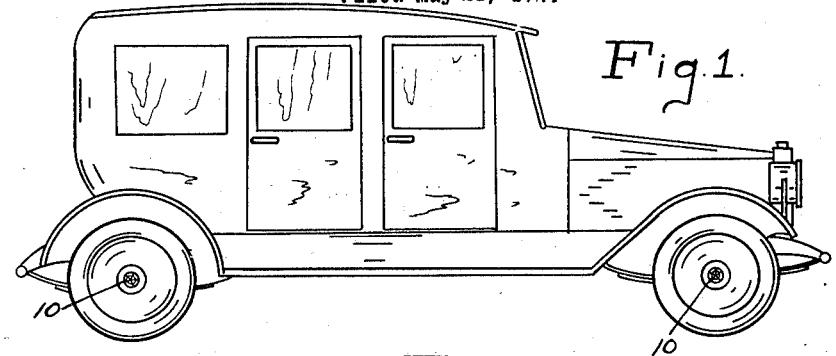
Figure 1 is a side elevation of a vehicle carrying reflecting lamps embodying this invention.

It is contemplated that ordinarily in the practice of this invention every hub cap of the motor vehicle equipped with this invention shall be made to carry a reflecting mirror of the type aforesaid. It will be obvious by referring to Figure 1 that where the hubs of the vehicle are so equipped, the driver of another vehicle approaching at right angles will obtain a very adequate conception of the length of the vehicle whose hub caps are reflecting the rays from his headlight. Furthermore, it will be obvious that if the vehicle equipped with this invention is in motion, the fact that the faceted mirrors are mounted on these hub caps and are consequently subjected to rotation, will make them much more conspicuous than would be the case if they were stationary. The facets of the mirrors 10 tend to emit the reflected light in comparatively narrow divergent beams, but if the mirror is rotated, as would be the case if it were mounted on the hub of a vehicle in motion, it will be clear that these various beams would be caused to move across the path of vision of the operator of an approaching vehicle and so would be extremely conspicuous.

Figure 2:
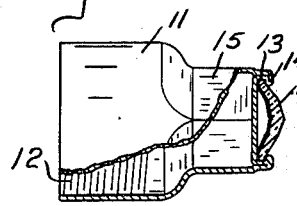
Figure 2 is a detail view partially in end elevation and part in axial section showing one type of mounting for a warning lamp.

Figure 2 represents the preferred mounting embodying this invention. The invention comprises an otherwise standard hub cap 11 internally threaded at 12 to receive the hub of the motor vehicle and provided at 13 with a recess in which the reflecting lens 10 is located. The material of the hub cap is upset at 14 about the margin of the lens to retain it permanently within the recess 13. This construction forms a very rigid, neat, and easily cleaned mounting for a reflecting lamp of the above described type. The presence of the mirror in no way interferes with the application of a wrench to the faces 15 of the hub cap in the ordinary manner.

Figure 5:
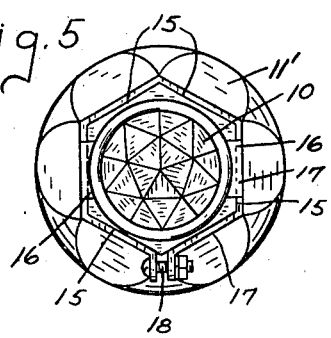
Figure 5 is a side elevation of a further modified mounting.
Figure 6:
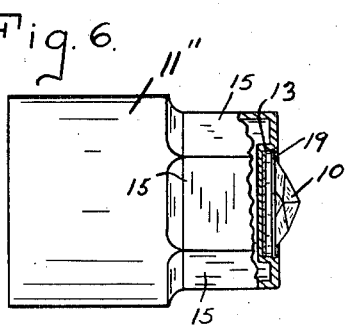
Figure 6 is an end elevation of a further modified embodiment of the invention.

Figures 5 and 6 show a hub cap 11' and 11" similar to that shown at 11 in Figure 2. In Figure 5 the reflecting lamp is carried by strips 16 which are fastened to a frame 17 that extends about the several flat faces 15 of the hub cap. A bolt 18 serves to draw the ends of the frame 17 together and engage such frame clampingly with the faces 15 of the hub cap. Obviously such frame and reflecting lamp may be applied to any standard hub cap of the type having surfaces 15. In the Figure 6 construction hub cap 11" has a recess 13 such as that shown in Figure 2, but instead of upsetting the hub cap to retain the reflecting lamp therein I merely employ an expanding split ring in the form of a wire spring 19 which fits within a complementary groove in the interior of the recess 13 and operates as a detent to hold the mirror 10 in place.

Figure 3:
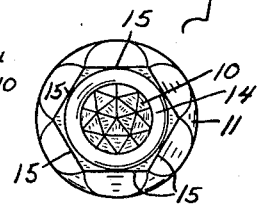
Figure 3 is a side elevation of the device shown in Figure 2.
Figure 4:
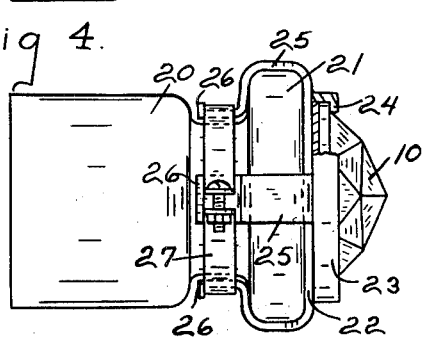
Figure 4 is an end elevation of a modified mounting embodying this invention.

Figure 4 shows a hub cap 20 such as is employed on many cars and which includes an ornamental enlargement such as is shown in 21. In this device the frame 22 applied to the outer face of the hub cap carries a flange 23 having a bead or rim 24 which retains the mirror straps 25 extending about the ornamental enlargement 21 of the hub cap and terminating in hook shaped extremities 26. An encircling clamp 27 engages these hook shaped extremities and tightens straps 25 about the enlarged portion 21 of the cap. This device, like that shown in Figure 5, may readily be applied to any standard hub cap of the particular type for which it is adapted. The mountings shown in Figures 2, 3 and 6 are made specially to receive directly in the body of the hub cap a reflecting mirror in accordance with this invention.

I claim:

1. The combination with a rotatable hub cap having an outer closed end face integral with the body portion of said cap, of a mirror secured to said outer face, said mirror being secured to said face by an integral portion of said cap bent into clamping engagement with the face of said mirror adjacent its margin.

2. The combination with a rotatable hub cap having an outer closed end face integral with the body portion of said cap, of a faceted mirror secured to said outer face and having its axis of rotation substantially coinciding with the axis of said cap, said mirror being secured to said face by an integral portion of said cap bent into clamping engagement with the face of said mirror adjacent its margin.

3. The combination with a rotatable hub cap, of a mirror secured to the outer end of said cap and having its axis of rotation substantially coinciding with the axis of rotation of said cap, said cap having portions integral therewith bent into clamping engagement with the front and rear faces of said mirror adjacent its margin.

4. The combination with a rotatable hub cap, of a faceted mirror secured to the outer end of said cap and having its axis of rotation substantially coinciding with the axis of rotation of said cap, said cap having portions integral therewith bent into clamping engagement with the front and rear faces of said mirror adjacent its margin.

5. The combination with a hub cap having an outer closed end face integral with the body portion of said cap, said face being recessed inwardly of said cap, of a mirror positioned within said recess, the margin of said recess being bent into engagement with the outer face of said mirror, thereby to retain the mirror in said recess.

6. The combination with a hub cap having an outer closed end face integral with the body portion of said cap, said face being recessed inwardly of said cap, of a faceted mirror positioned within said recess, the marginal wall of said recess being bent into engagement with the outer face of said mirror.

7. The combination with a rotatable hub cap, of a jewel secured thereto at the outer end of said cap with its axis of rotation substantially coincident with the axis of rotation of said cap, said cap having integral portions engaging said jewel adjacent its margin and adapted to retain said jewel upon said cap.

8. The combination with a rotatable hub cap, of a jewel secured thereto at the outer end of the cap having its axis of rotation substantially coinciding with the axis of rotation of the cap, said cap having an integral portion engaging the front of the jewel adjacent its margin whereby to retain it in position.

HARRY D. MULLAN.